United States Patent [19]
Mathe et al.

[11] 4,117,064
[45] Sep. 26, 1978

[54] METHOD FOR TWISTING STRIP MATERIAL

[75] Inventors: George L. Mathe, Bon Air; Jerome S. Osmalov, Richmond, both of Va.

[73] Assignee: Philip Morris Incorporated, New York, N.Y.

[21] Appl. No.: 683,393

[22] Filed: May 5, 1976

Related U.S. Application Data

[62] Division of Ser. No. 492,196, Jul. 26, 1974, abandoned.

[51] Int. Cl.$^2$ .............................................. B29F 3/10
[52] U.S. Cl. .................................... 264/103; 156/156; 264/173; 264/174; 425/112; 425/391
[58] Field of Search ............... 264/210 R, DIG. 47, 264/103, 173, 174; 425/334, 321, 366, 391, 113, 114, 516; 80/5.1, 10.1, 31.2; 72/64, 78; 156/156, 244

[56] References Cited

U.S. PATENT DOCUMENTS

| 60,067 | 11/1866 | Sanford | 80/5.1 |
|---|---|---|---|
| 738,933 | 9/1903 | O'Donnell | 72/64 |
| 1,201,582 | 10/1916 | Hasselberg et al. | 72/78 |
| 1,257,435 | 2/1918 | Williams | 72/64 |
| 2,545,869 | 3/1951 | Bailey | 264/103 |
| 2,636,923 | 4/1953 | Perzel | 264/274 |
| 2,778,059 | 1/1957 | Henning et al. | 264/103 |
| 3,441,637 | 4/1969 | Davis | 264/173 |
| 3,579,623 | 5/1971 | Thomson et al. | 264/174 |
| 3,725,178 | 4/1973 | Kleykamp et al. | 156/244 |

FOREIGN PATENT DOCUMENTS

| 483,472 | 7/1953 | Italy | 72/64 |
|---|---|---|---|
| 37,016 | 10/1954 | Poland | 72/64 |

*Primary Examiner*—Jeffery R. Thurlow
*Attorney, Agent, or Firm*—Watson, Leavenworth, Kelton & Taggart

[57] ABSTRACT

A method for shaping a helical twist in a ribbon of thermoplastic material, as well as a method of making a composite structured article in which a tubular sheet is formed around the twisted ribbon is disclosed.

2 Claims, 4 Drawing Figures

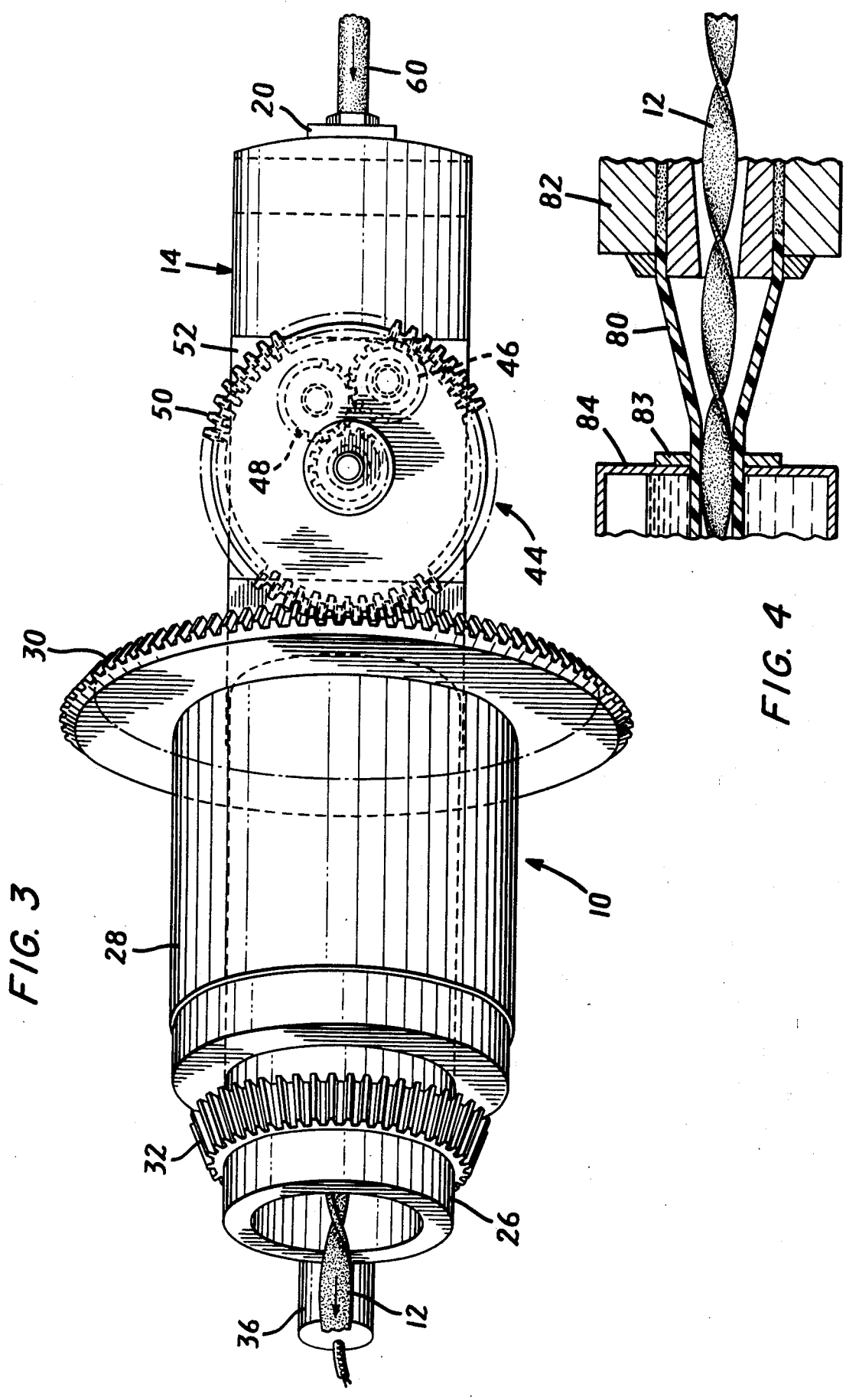

METHOD FOR TWISTING STRIP MATERIAL

This is a division, of application Ser. No. 492,196, filed July 26, 1974 now abandoned.

BACKGROUND OF THE INVENTION

It is known that a continuous helical ribbon of thermoplastic material can be formed in an extrusion process. This can be done by applying a rotary motion to the extrusion die, the latter being provided with a slit orifice to produce the ribbon shape with the rotary motion of the die imparting the desired helical configuration. While this procedure is satisfactory for producing the intended helical thermoplastic material configuration, it has certain drawbacks. If the processing operation is run at high speed, i.e. relatively high ribbon line speed, there is likely to be imparted to the ribbon a whipping action tending to rotate the ribbon about its travel axis and with a whip spread of increasingly enlarging expanse which can lead to rupture of the ribbon with consequent process breakdown. Furthermore, it is difficult and expensive to construct an extrusion die of the rotating type due to the high order of material pressure therein (up to several thousand psi) without there being problems associated with leakage of the compressed thermoplastic resin from the extrusion chamber into bearing surfaces within the die.

It is also known that a flat ribbon of malleable or readily workable material, such as thermoplastic material can be passed between a pair of crossed rolls to impart a twist to the material. However, this procedure also imparts a rotary or rotational effect to the ribbon which at high speed can similarly result in creation of a whipping action leading to possible breakdown of the processing procedure. Of more consequence and if the twisted material were intended to be inserted into a tubular component of similar material, the rotary motion of the ribbon would interfere with effective combination of the two parts to produce a desired intended composite structured product.

Thus while it is known to produce a continuous ribbon of thermoplastic material which has a helical configuration, the prior art has not provided optimal method and apparatus for achieving this purpose.

SUMMARY OF THE INVENTION

The present invention is concerned with apparatus and method for shaping a continuous ribbon of stock of thermoplastic material to impart a helical twist thereto, the twisting of the ribbon being effected without imparting any bodily rotation to the ribbon during the formation of the twist therein. In accordance with the invention, a continuous ribbon of stock is advanced through a nip between a pair of oppositely biased crossing rolling surfaces rotating about fixed axes to therewith twist the ribbon. Concurrently the rolling surfaces are rotated bodily about the axis of advance of the ribbon to compensate for any rotational effect produced in the ribbon during its passage through the nip of the rolling surfaces.

Further in accordance with the invention, apparatus for shaping the ribbon to impart helical twist thereto is provided, the apparatus including a rotary head having a passage extending therethrough and being rotatable about a fixed axis extending centrally through the passage. A pair of rolls are carried in the rotary head for rotation about a fixed roll axis with the rolls being disposed in oppositely biased crossing array in the central passage of the head and being spaced from each other so as to present along common length surfaces thereof a nip therebetween. Desirably the expanse of the nip between the rolls is disposed symmetrically of the passage of the rotary head passage fixed axis. The apparatus also includes means for guiding a continuous ribbon axially into the passage in the rotary head and through the nip of the rolls. Thus upon rotation of the rolls, the rolls will advance the ribbon through the head and impart a twist to the ribbon. Concurrently with the advance of the ribbon through the rolls, the head structure is rotated about its fixed axis and the rolls are rotated about their respective roll axes with the rotation of the head structure changing the disposition of the roll axes about the fixed axis concurrent with the advance of the ribbon to compensate for any bodily rotational effect produced in the ribbon by the rotation of the rolls. In general, the rotary head is an elongated cylindrical shaped structure and has ribbon guiding means carried at one end thereof with the rotary head further including an elongated sleeve part fixedly connected to the other end of the structure so as to be rotatable therewith. The sleeve is supported rotatably along a substantial portion of its length in a fixed collar with the fixed collar having a fixed gear means at one end thereof, viz., at the location where the sleeve is connected to the rotary head. The sleeve extends through the fixed collar and the distance beyond the other end of the same so that drive for rotating this sleeve and hence the rotary head can be effected through the sleeve itself. Conveniently this is done by fixing a gear to the sleeve to effect drive to the sleeve with a motor driven gear meshing with the sleeve gear. Concurrent rotation of the rolls about their respective roll axes in the rotary head is effected through driver gear means carried on the rotary head and in mesh with the fixed gear on the collar. Thus as the sleeve and hence the rotary head is rotated about the fixed axis, the driver gears in engagement with the fixed gear on the collar are caused to rotate and transmit drive to the rolls. Desirably separate gear trains are associated with each of the rolls and each gear train is disposed in a radially extending housing component on the rotary head.

To facilitate passage of the continuous ribbon through the apparatus, the surfaces of the rolls can be knurled.

The continuous ribbon following the formation of a twist therein can thereafter be used for any one of a number of purposes. In accordance with a further aspect of the invention, a tubular sheath of thermoplastic material can be extruded concurrent with twisting of the continuous ribbon with the ribbon being advanced into the sheath and the sheath pulled down into tight engaging contact with the edges of the ribbon. The resultant composite structured product of a thermoplastic tube with a thermoplastic helically twisted ribbon disposed therein can be used as a cigarette mouthpiece or a decorative tube piece of certain ornamental character in which the outer tube is transparent. Additionally, such article would have enhanced strength due to the reinforcement provided by the helical ribbon therein and could be used for other purposes such as a duct or conduit for conveying various forms of fluids.

The invention accordingly comprises the several steps and the relation of one or more of such steps with respect to each of the others thereof, and the apparatus having the features of construction, combination of elements and arrangements of parts which will be exemplified in the construction hereinafter set forth and the scope of the invention will be indicated in the claims.

BRIEF DESCRIPTION OF THE DRAWINGS

A fuller understanding of the nature and the objects of the present invention will be had from the following description taken in conjunction with the accompanying drawings in which:

FIG. 3 is a perspective view of the apparatus shown in FIGS. 1 and 2.

FIG. 4 is a fragmentary sectional view depicting a method for forming a composite structured article in which ribbon twisted in the apparatus is encased in an extruded tubular sheath of thermoplastic material.

Throughout the following description like reference numerals are used to denote like parts in the drawings.

DESCRIPTION OF THE PREFERRED EMBODIMENTS

The present invention is concerned with apparatus and method for shaping a continuous ribbon of readily workable materials, e.g., thermoplastic material to impart a helical twist thereto without imparting any bodily rotation effect to the ribbon about its advance course while it is being twisted.

Figure 1:
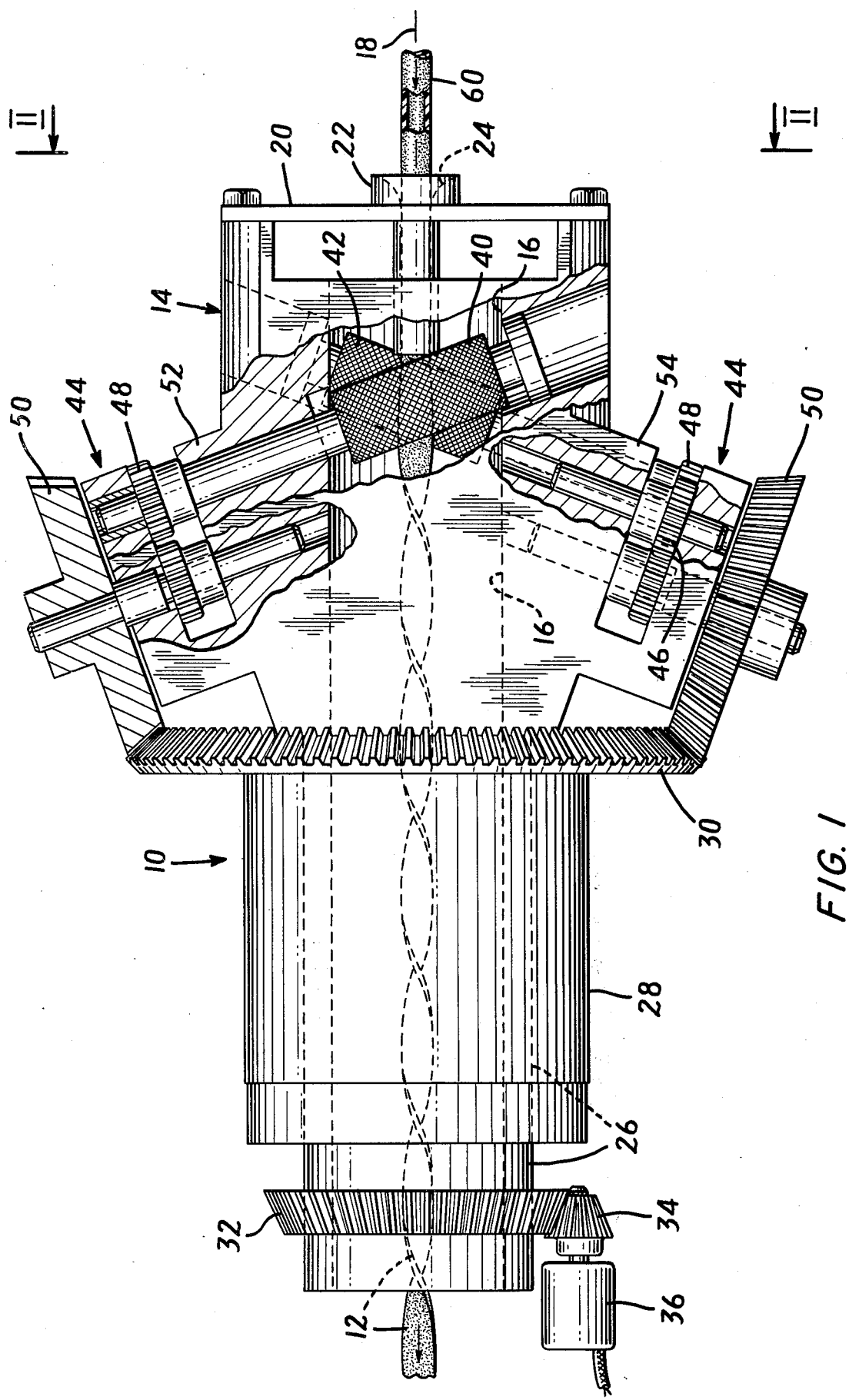
FIG. 1 is an elevational view of apparatus with which a continuous ribbon of thermoplastic material may be shaped to impart a helical twist thereto, portions of the apparatus being broken away for purposes of clarity to depict the arrangement of the twist imparting rolls and the gear trains associated therewith.
Figure 2:
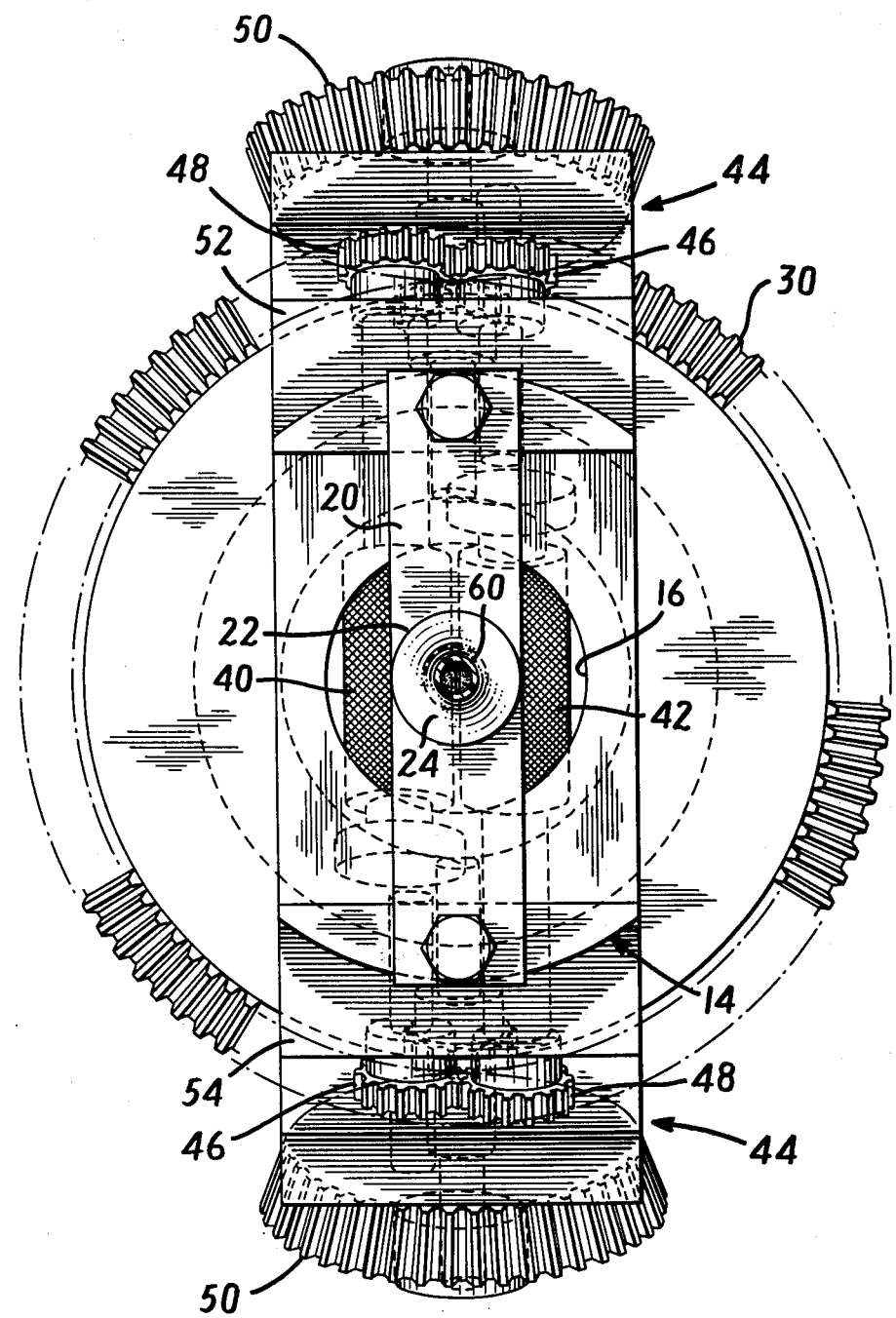
FIG. 2 is an end elevational view as taken along the line II—II in FIG. 1.

Referring now to FIGS. 1-3 of the drawings, there is shown apparatus 10 with which a continuous ribbon 12 of thermoplastic material can be shaped to impart a helical twist thereto. The apparatus 10 comprises a rotary head shown generally at 14 which desirably is an elongated generally cylindrically configured structure having a central bored passage 16 extending therethrough, the rotary head being designed for rotation about a fixed axis 18 passing centrally through said passage 16 and constituting the axis in which the continuous ribbon 12 of thermoplastic material is advanced to impart a helical twist thereto. One end of the rotary head 14 is provided with an end plate 20 and centrally disposed in said plate and extending into the passage 16 is a guide tube 22, the latter being provided to guidingly direct the continuous ribbon stock into the rotary head with the guide tube being disposed axially of said passage and having an enlarged flared portion as at 24 to facilitate entry of the ribbon stock to the rotary head. At the opposite end of the rotary head structure 14, the same is provided with a tubular extension 26 which is made preferably integral with the rotary head structure 14. The tubular sleeve 26 in turn is along a substantial portion of its length, rotably supported in a fixed collar 28. At one end, the collar 28 is provided with 8 large bevel gear 30 fixed to the collar. At the opposite end of the tubular sleeve 26 a second gear 32 is fixed to the sleeve and it in turn is in mesh with a motor driven gear 34. Thus the motor 36 is used to rotatably drive the sleeve 26 and in turn the rotary head structure 14. A pair of rolls 40 and 42 are carried in the rotary head and are so disposed therein as to rotate about fixed roll axes within the head, the rolls being disposed in oppositely biased crossing array in the central passage 16. Further the rolls 40, 42 are spaced from each other so as to present along a common length surface thereof a nip therebetween, the expanse of the bight being disposed symmetrically of the passage fixed axis as best noted in FIG. 2.

The drive for the rolls 40, 42 is provided by gear trains 44 associated with each. Thus each gear train 44 includes a pair of gears 46 and 48 which are driven off a bevel pinion gear 50, the gear 50 in turn being in mesh with the fixed bevel gear 30 on the collar. For accommodating the gear trains 44 the rotary head structure 14 is provided with radially extending housing components 52 and 54 in which are mounted the gear trains.

When it is desired to impart twist to a stock of thermoplastic material, the same is advanced through the guide tube 22 and into the nip between the rolls 40 and 42. To further facilitate advance of the ribbon through the apparatus, the rolls 40 and 42 can have knurled outer surfaces. As shown in FIG. 1, the stock from which the continuous twisted ribbon is shaped can be a tubular thermoplastic material stock 60 which upon passage through the nip of the rolls 40, 42 is simulaneously flattened and has twist imparted thereto. In effecting a twisting of the continuous ribbon, the rolls 40, 42 have a tendency to impart a bodily rotational movement to the continuous ribbon. However to compensate for this so that the shaping occurs without imparting any bodily rotation to the ribbon, the disposition of the rolls 40, 42 about said fixed axis 18 is constantly changed by the rotation of the rotary head structure 14 concurrent with the advance of the ribbon through the apparatus.

Upon exit of the continuous stock of ribbon 12 from the apparatus as at 70, the now twisted ribbon can be fed inside a tubular extrudate 80 formed on an extruding machine 82 in the manner shown in FIG. 4 and now to be described.

With reference to FIG. 4, the ribbon 12 which has been twisted, is advanced centrally through an extrusion die 82 from which issues a thermoplastic continuous extrudate 80, the ribbon being advanced centrally into and codirectionally with the extrudate 80. The extrudate 80 thereafter is advanced through the closing aperture 83 of a cooling chamber 84 to pull down the tubular extrudate into tight engagement about the twisted ribbon, the inner surfaces of the tubular sheath being brought into contact with the opposite side edge surfaces of the ribbon. In this manner a novel composite structured article can be formed which may serve many purposes. For example, the composite article can serve as a conduit through which can be transmitted two different fluids, one on either side of the ribbon. Additionally, the presence of the ribbon in the tubular sheath enhances the strength of the sheath so that the article could, e.g., serve as an underground gas conduit wherein conduit strength is an important consideration.

While the foregoing description has been given in terms of twisting a thermoplastic ribbon and forming a composite structured article of thermoplastic, it will be obvious to those skilled in the art that the present invention is equally suited for use in connection with materials other than thermoplastic including, but not limited to aluminum, steel and the like.

The term "ribbon" as used herein is inclusive of such shaped articles as tubular material, rods and films which are generally of a continuous length to facilitate feeding them into the apparatus. If a thermoplastic rod or other solid article is utilized as the feed stock, it is obvious to the artisan to consider the shear stress in the nip.

It will thus be seen that the objects set forth above among those made apparent from the foregoing description are efficiently obtained, and since certain changes in the construction and procedure set forth which embody the invention may be made without departing from the scope, it is intended that all matters contained in the above description shall be interpreted as illustrative and not in a limiting sense.

What is claimed is:

1. A method for shaping a continuous ribbon of thermoplastic stock to impart a helical twist thereto which comprises advancing a continuous thermoplastic tube along a fixed, straight longitudinally directed axis and through the nip between cooperating rotating surfaces of oppositely biased rotating members rotating about fixed axes and disposed in crossing array relative to said advance course to present common strip engaging lengths on said surfaces thereby to flatten said tubing as a continuous ribbon and impart a helical twist to said ribbon without imparting any bodily rotation effect to the ribbon by concurrently bodily rotating said members about the fixed axis of advance of said ribbon to compensate for any rotational effect produced in said ribbon by said members tending to rotate said ribbon bodily about said axis of advance.

2. A method for forming a composite structured article which comprises twisting a continuous ribbon in accordance with claim 1, extruding a continuous tubular sheath of thermoplastic material at a predetermined dimension, advancing said twisted ribbon into and codirectionally with said extrudate, and uniformly drawing said tubular sheath down to a smaller dimension and against the opposite side edges of said ribbon by passing said tubular sheath through a closing apparatus.

* * * * *

UNITED STATES PATENT AND TRADEMARK OFFICE
CERTIFICATE OF CORRECTION

PATENT NO. : 4,117,064
DATED : September 26, 1978
INVENTOR(S) : George L. Mathe and Jerome S. Osmalov It is certified that error appears in the above-identified patent and that said Letters Patent are hereby corrected as shown below:

At Col. 2, line 4, "expanse of the nip" should read --expanse of the bight--.

At Col. 3, line 59, "with 8 large" should read --with a large--.

Signed and Sealed this

Sixth Day of February 1979

[SEAL]

Attest:

RUTH C. MASON
Attesting Officer

DONALD W. BANNER
Commissioner of Patents and Trademarks